United States Patent [19]

Evenstad

[11] 4,251,244
[45] Feb. 17, 1981

[54] JET PULSE BAG TYPE COLLECTOR

[75] Inventor: Donovan C. Evenstad, Coraopolis, Pa.

[73] Assignee: Wheelabrator-Frye Inc., Hampton, N.H.

[21] Appl. No.: 19,426

[22] Filed: Mar. 12, 1979

[51] Int. Cl.³ .............................................. B01D 46/04
[52] U.S. Cl. ..................................... 55/302; 55/341 R; 55/379
[58] Field of Search ...................... 55/302, 341 R, 379

[56] References Cited
U.S. PATENT DOCUMENTS

| | | | |
|---|---|---|---|
| 2,503,568 | 4/1950 | Timm | 55/379 X |
| 3,844,750 | 10/1974 | Ray | 55/379 |
| 3,876,402 | 4/1975 | Bundy et al. | 55/379 X |
| 3,997,305 | 12/1976 | Ulvestad et al. | 55/379 X |

Primary Examiner—Kathleen J. Prunner
Attorney, Agent, or Firm—McDougall, Hersh & Scott

[57] ABSTRACT

A jet pulse bag type collector which makes use of a venturi and a wire cage which extends internally substantially throughout the length of the filter bag, in which the wire cage is supported from the venturi and the filter bag is supported between the wire cage and a portion depending from about the opening through the tube sheet of the collector.

5 Claims, 8 Drawing Figures

JET PULSE BAG TYPE COLLECTOR

This invention relates to a pulse jet bag type dust collector and it relates more particularly to an improvement in the means for removably mounting the filter bag and cage assembly and the venturi in the collector.

Pulse jet baghouse type dust collectors have found widespread use in the treatment of air or other gases for removing suspended dust, dirt and other particulates and the construction of such collectors are well known in the trade. As illustrated in FIG. 1 of the accompanying drawings, such pulse jet type dust collectors include a housing 10 subdivided by a horizontally disposed tube sheet 12 into an upper clean gas plenum chamber 14 and a lower dirty gas plenum chanber 16 which includes a baghouse 18 into which a plurality of elongated filter bags 20 extend from openings 22 through the tube sheet. The bottom side of the dirty gas plenum chamber is contiguous with an underlying hopper 24, the walls of which converge to a trough 26 in which a feed screw 28 operates for removing solids that fall into the hopper. Other means for removal of collected solids can be employed, such as a sealed door or the like.

The dirty gas plenum chamber is provided with an inlet 30 and the clean gas plenum chamber 14 is provided with an outlet 32 which communicates with an exhaust fan (not shown) whereby gas to be cleaned is drawn through the inlet into the dirty gas plenum chamber and to the outside of the filter bags 20 where the dust, dirt or particulates are separated on the ingoing side of the filter bags to form a filter cake as the carrier gas filter on through into the interior of the bags and up into the clean gas plenum chamber.

In order to avoid buildup of the filter cake to the point where the pressure drop across the filter surface becomes excessive, it is desirable periodically to remove the filter cake and clean the bags. This is done in a pulse jet type dust collector by directing a short burst of high pressure gas into the open end at the top of the filter bag, as by means of a jet nozzle 36, connected to a header 38 that communicates with a source of high pressure air. To accentuate the burst, the jet is drawn downwardly into a venturi 41 extending into the open end of the bag to create a shock wave that travels rapidly downwardly through the length of the filter bag to loosen the filter cake built up on the ingoing side thereof. Upon removal, the separated particulates fall gravitationally downwardly through the baghouse and into the hopper for removal.

Each filter bag is supported by an open wire cage 42 which extends internally substantially through the length of the bag. Currently, the cage is provided with an annular flange adapted to rest on the top side of the tube sheet whereby the cage is supported in position of use. The venturi too is formed with an annular flange for support of the venturi within the open end of the filter bag whereby the venturi is independently supported by the tube sheet as the annular flange comes to rest thereon or on the underlying flange of the cage.

It is an object of this invention to simplify the design of the venturi, wire cage and associated hardware by elimination of elements while at the same time enhancing the stability of the assembled parts, thereby to make installation and maintenance much easier while improving the operation of the collector.

These and other objects and advantages of this invention will hereinafter appear and for purposes of illustration, but not of limitation, an embodiment of the invention is shown in the accompanying drawings in which.

Figure 1:
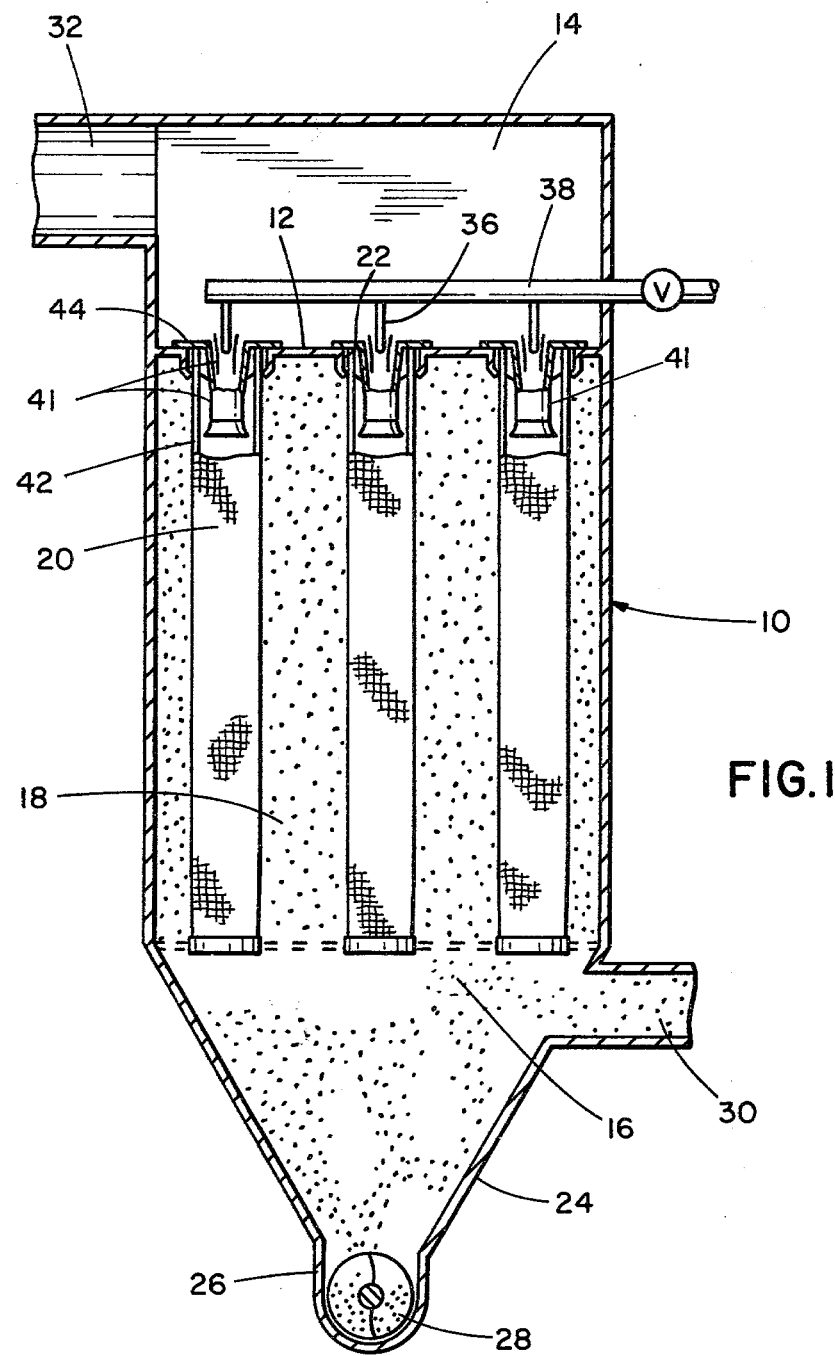
FIG. 1 is a schematic sectional elevational view of a pulse jet bag type dust collector to which this invention is addressed.

In accordance with the practice of this invention, the venturi is formed with an annular flange 44 extending outwardly from the upper edge thereof with the flange having a dimension that is greater than the opening 46 through the tube sheet 12 so that portions of the flange extending beyond the opening will rest on the adjacent portions of the tube sheet to support the venturi which is of smaller diameter than the opening and extends downwardly axially therethrough, when in position of use.

The wire cage 42 is dimensioned to have a length to extend substantially throughout the length of the bag 20 and a diameter slightly less than the internal diameter of the bag so as to be able to extend through the interior of the bag for support. The wire cage is a relatively rigid member formed of a plurality of longitudinally spaced apart wire hoops 48 and a plurality of elongate wires 50 arranged in circumferentially spaced apart relation about the interior or exterior of hoops 48 with the wires fixed to the hoops at their crossover points, as by spot welding, soldering, adhesive, clips or other fastening means.

The cage has an end cap 52 in the form of a metal sheet fixed to the bottom end of the wires. In the preferred arrangement, other than the uppermost hoops 48, the hoops are disposed inwardly of the longitudinally extending wires although the wires can be arranged to extend alongside the inner periphery of the hoops. The bottom end of the filter bag is closed and is adopted to rest on the end cap 52.

In accordance with the practice of this invention, the cage is supported by the venturi and the filter bag is maintained in position of use about the cage by entrapment of the upper end of the filter bag between the upper end of the cage and a tubular portion extending downwardly from the tube sheet about the opening.

Figure 2:
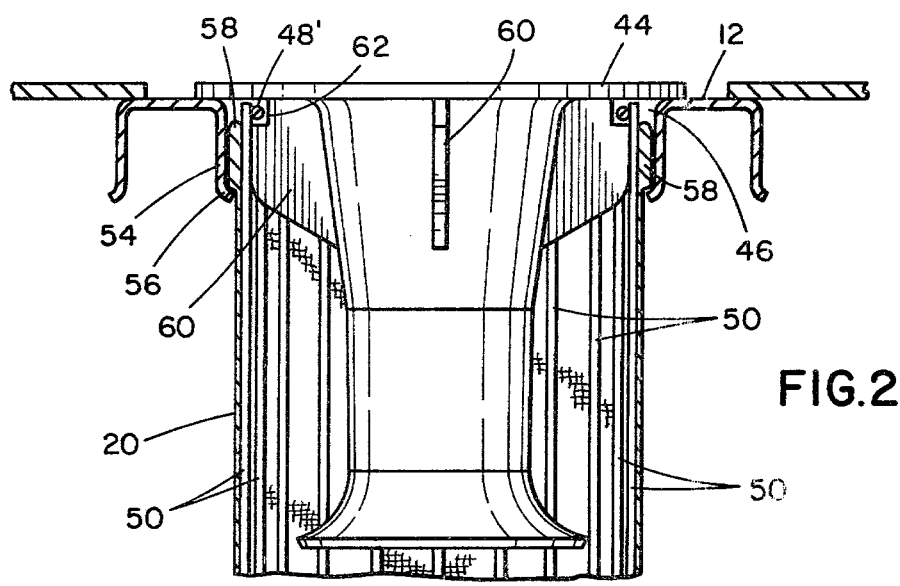
FIG. 2 is a sectional elevational view showing portions of the venturi, wire cage and filter bag embodying the features of this invention in position of use in the collector.
Figure 3:
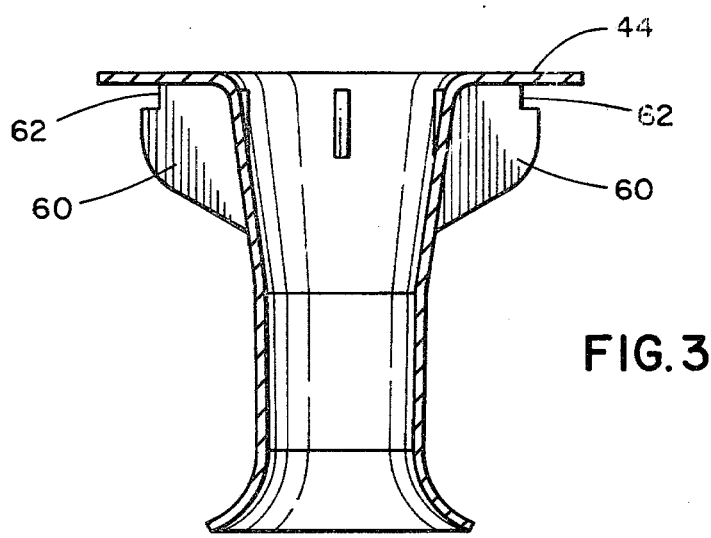
FIG. 3 is a sectional elevational view of the venturi shown in FIG. 2.
Figure 4:
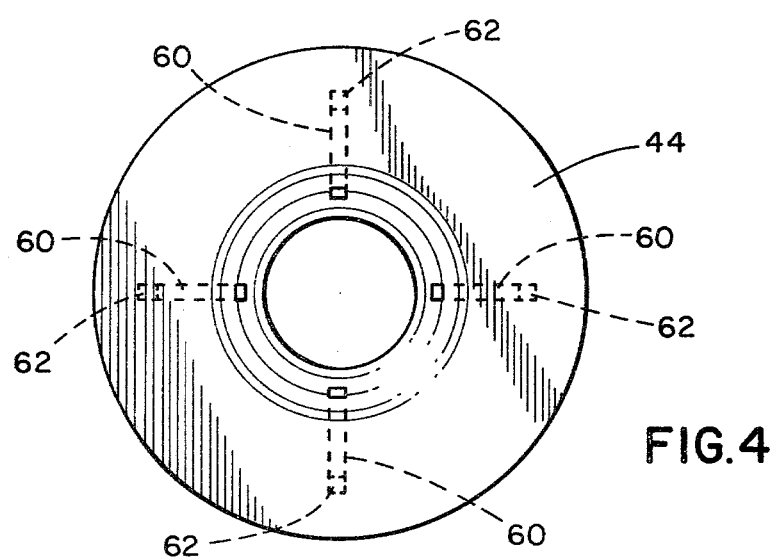
FIG. 4 is a top plan view of the venturi shown in FIG. 3.
Figure 5:
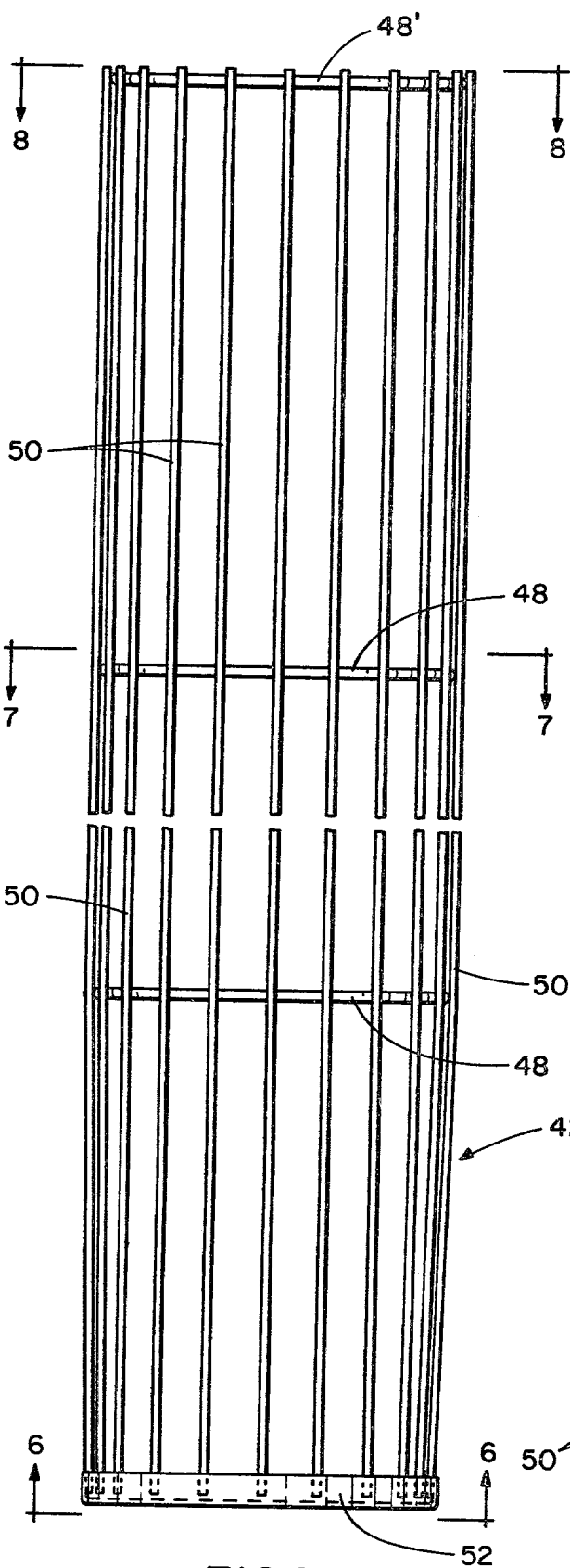
FIG. 5 is a fragmentary elevational view of the wire cage.
Figure 6:
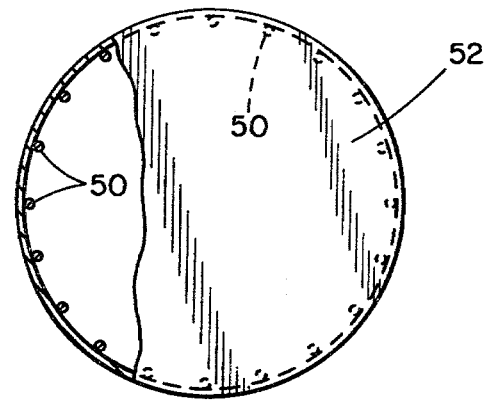
FIG. 6 is a sectional view taken along the line 6—6 of FIG. 5.
Figure 7:
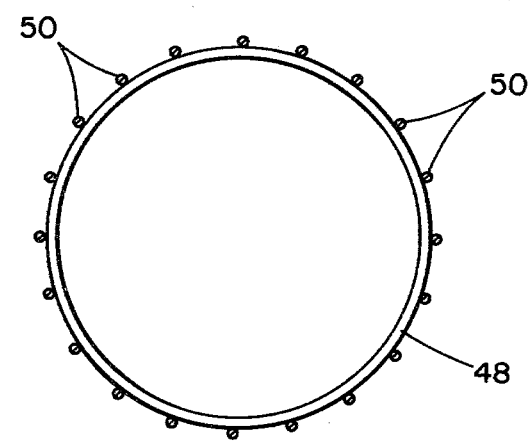
FIG. 7 is a sectional view taken along the line 7—7 of FIG. 5.
Figure 8:
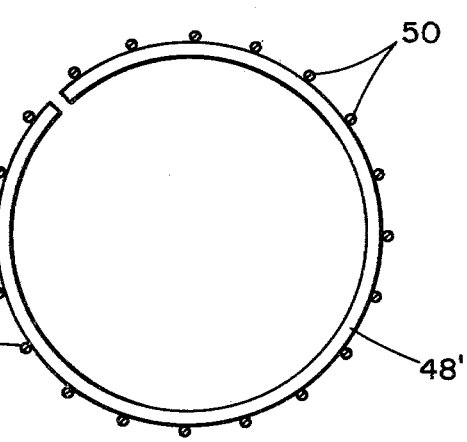
FIG. 8 is a sectional view taken along the line 8—8 of FIG. 5.

As illustrated in detail in FIG. 2, a tubular section 54 extends downwardly for a short distance from the tube sheet 12 about the opening 46 and terminates at its lower end in a lip 56 which extends inwardly for a distance to define an opening slightly greater than the diameter of the filter bag and cage.

At its upper end portion and preferably throughout its length, the wire cage is of a diameter slightly less than the opening defined by the lower lip 56 of the tubular member so as slideably to fit therein while enabling endwise displacement of the cage and filter bag relative thereto. The filter bag 20 is retained in position of use about the cage by means of a ring member 58 secured, as by means of a hem in the upper end of the filter bag with the ring member, when in position of use about the cage, having an outer diameter less than that of the tubular member 54 but greater than that of the opening defined by the lower lip section and with the ring member having a length less than the length of the tubular member so that the ring member becomes entrapped in the space between the tubular member and the upper end of the cage, when in position of use.

The upper end of the cage is in turn supported from the venturi. For this purpose, the venturi is formed at its upper end with a plurality of circumferentially spaced apart web members 60 which extend radially outwardly, immediately adjacent the underside of the flange 44, for a distance whereby the ends define a circular path corresponding to the internal diameter of the cage so that the webs terminate alongside the cage. The outer ends of web members, immediately below the flange 44, are provided with recesses 62 and means are provided to extend inwardly from the upper end of the cage for receipt within the recessed portions whereby the cage is supported from the venturi.

In the illustrated modification, such seating means comprises the upper hoop 48' which is disposed internally of the wires 50 whereby the hoop member 48' will extend into the recessed portions when the cage is mounted in position of use on the venturi. In order to enable the hoop member to be displaced about the web section for entry into the recessed portion, the upper hoop 48' is split so that its diameter can be expanded to slide over the web sections of the venturi for engagement in the recessed portion. Thus the wire cage can be engaged and disengaged from the hub portion of the venturi for removal or replacement of the cage.

In the assembled relation, the weight of the cage is supported by the venturi which, in turn, is supported by the tube sheet. The combined weight will operate to provide for a more stable positioning of the venturi as well as the elements supported thereby.

Since the fit between the outer diameter of the cage and the opening defined by the tube sheet and the surrounding tubular member is relatively tight, the cage is blocked from expansion which would inadvertently enable the cage to become disengaged from the venturi once the assembly is in place. By the same token, the ring 58 fixed to the upper end of the filter tube 20, becomes entrapped between the tubular member 54 and the cage to prevent displacement beyond the lip of the tubular member thereby to retain the filter bag in position of use about the cage.

It will be apparent that the venturi with the cage and bag previously mounted thereon can merely be inserted from the top side of the tube sheet through the opening to project the cage and filter bag into the baghouse. The assembly can be lowered until the venturi flange 44 comes to rest on the top side of the tube sheet 12, at which time the filter bag ring 58 will become entrapped between the tubular member 54 and the cage while the cage will be confined by the venturi and tubular member to prevent disengagement.

For disassembly, the operations are reversed in that the assembled venturi, cage and filter bag are merely raised upwardly through the opening in the tube sheet. This releases the bag after which the upper loop of the cage can be expanded for displacement from the recesses of the web section of the venturi and to enable the loop to be slipped over the webs for release from the venturi.

The term "filter bags", as used herein, refers to elongate porous members formed of such fibers as cotton, silk, hemp, or other natural fibers, glass, asbestos and the like inorganic fibers, or fibers manufactured under the name Orlon, Dacron (polyester), Nylon (polyamide) or the like man-made fibers, or combinations thereof. Such bags may be in the form of woven or felted fabrics of fibers of the type described above, but it is preferred to fabricate the filter bag of fibrous fabrics characterized by good wear resistance, good chemical resistance, and fibers which are resistant to high temperatures to enable use in the treatment of gases exhausted at elevated temperatures from such chemical operations as cement plants, aluminum plants, and the like. In a jet pulse bag collector, the bags are closed at the bottom and open at the top with the nozzle for the jet pulse in alignment with the open end.

It will be understood that changes may be made in the details of construction, arrangement, and operation, without departing from the spirit of the invention, especially as defined in the following claims.

I claim:

1. In a jet pulse bag type collector having a horizontally disposed tube sheet with at least one opening through the tube sheet, a filter bag and cage assembly mounted to extend from the opening, means for support of said cage assembly from the tube sheet and means for support of the filter bag from the cage assembly and tube sheet with the open end of the bag in communication with said opening, and a venturi extending through the open end of the filter bag, the improvement wherein the cage assembly is supported on the venturi while the venturi is supported from the tube sheet comprising webs extending outwardly from the venturi for a distance to extend alongside the inner side of the cage assembly, a recessed portion extending inwardly from an outer edge of the webs, means extending inwardly from an upper portion of the cage assembly for engagement in the recessed portions of the webs whereby the cage assembly is retained by the webs of the venturi while in the assembled relation, and means for supporting the venturi from the tube sheet in which the filter bag is circular in cross section and in which the means for support of the filter bag comprises a ring member fixed to the upper end portion of the filter bag having an outside diameter greater than the diameter of the bag and an internal diameter greater than the outside diameter of the cage assembly, a support member depending from the tube sheet about the opening and defining a tubular portion having a length greater than the length of the ring member, an internal diameter greater than the outside diameter of the ring member, and a lip extending inwardly from the lower end portion defining an opening greater than the diameter of the bag and cage assembly but less than the outside diameter of the ring member.

2. A collector as claimed in claim 1 in which the webs extend from the venturi in circumferentially spaced apart relation and in which the cage assembly is a wire cage formed of a plurality of longitudinally spaced circular hoops including an uppermost hoop in which the hoops are interconnected by a plurality of longitudinally extending wires circumferentially spaced about the hoops, in which the means extending inwardly from the upper portion of the cage assembly comprises the uppermost hoop positioned internally of the longitudinal wires and having an internal diameter dimensioned to seat the uppermost hoop in the recessed portion of the webs, said uppermost hoop being split to enable expansion for passage over the webs until the uppermost hoop becomes engaged within the recessed portions of the webs.

3. A collector as claimed in claim 1 in which the means for support of the venturi from the tube sheet comprises a flange extending outwardly from an upper end portion of the venturi for a distance to extend beyond the opening in the tube sheet whereby the flange rests on portions of the tube sheet about the opening, when in the assembled relation.

4. A collector as claimed in claim 3 in which the opening in the tube sheet is a circular opening and the flange is an annular flange having a diameter greater than the diameter of the opening through the tube sheet and in which the inwardly extending recessed portions of the webs are located immediately below the annular flange.

5. A collector as claimed in claim 1 in which the support member comprises a tubular member.

* * * * *